(12) United States Patent
Wittmann et al.

(10) Patent No.: US 9,821,626 B2
(45) Date of Patent: Nov. 21, 2017

(54) HEATING, VENTILATION AND/OR AIR-CONDITIONING APPARATUS INCLUDING AN AIR FLOW CHANNEL BYPASSING A HEAT EXCHANGER

(75) Inventors: Klaus Wittmann, Le Mesnil Saint Denis (FR); Mohamed Yahia, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 647 days.

(21) Appl. No.: 14/118,445

(22) PCT Filed: May 4, 2012

(86) PCT No.: PCT/EP2012/058303
§ 371 (c)(1),
(2), (4) Date: Feb. 21, 2014

(87) PCT Pub. No.: WO2012/159872
PCT Pub. Date: Nov. 29, 2012

(65) Prior Publication Data
US 2014/0194048 A1 Jul. 10, 2014

(30) Foreign Application Priority Data
May 20, 2011 (FR) ...................................... 11 01550

(51) Int. Cl.
*B60H 1/00* (2006.01)
*B60H 1/03* (2006.01)
*B60H 1/24* (2006.01)

(52) U.S. Cl.
CPC ....... *B60H 1/00028* (2013.01); *B60H 1/0005* (2013.01); *B60H 1/034* (2013.01);
(Continued)

(58) Field of Classification Search
CPC ............ B60H 1/00457; B60H 1/00464; B60H 1/00471; B60H 1/247; B60H 3/06;
(Continued)

(56) References Cited

U.S. PATENT DOCUMENTS 5,309,731 A * 5/1994 Nonoyama ........ B60H 1/00849
62/244
5,478,274 A 12/1995 Danieau
(Continued)

FOREIGN PATENT DOCUMENTS

DE 2941183 A1 4/1981
DE 10336248 B3 9/2004
(Continued)

OTHER PUBLICATIONS

International Search Report for Application No. PCT/EP2012/058303 dated Jun. 5, 2012, 6 pages.
(Continued)

*Primary Examiner* — Steven B McAllister
*Assistant Examiner* — Ko-Wei Lin
(74) *Attorney, Agent, or Firm* — Howard & Howard Attorneys PLLC (57) ABSTRACT

A heating, ventilation and/or air-conditioning apparatus (1) for the passenger compartment of a motor vehicle includes a housing (2) comprising a first air inlet (3) and a second air inlet (4). The housing (2) directs an inner air flow (Fi) from the first air inlet (3) and/or the second air inlet (4) and contains at least a first heat exchanger (5). The housing (2) includes: an air flow channel (24) directing the inner air flow (Fi) in the housing (2) while bypassing the first heat exchanger (5); and an air inlet duct (23) directing the inner air flow (Fi) in the housing (2) through the first heat exchanger (5). A heating, ventilation and/or air-conditioning installation for the passenger compartment of a motor vehicle includes: an air conditioning loop through which a coolant flows. The loop includes at least one compressor, a
(Continued)

first expansion member, an outer heat exchanger and the first heat exchanger (5). The installation also includes the heating, ventilation and/or air-conditioning apparatus (1).

17 Claims, 2 Drawing Sheets

(52) U.S. Cl.
CPC ..... *B60H 1/24* (2013.01); *B60H 2001/00085* (2013.01); *B60H 2001/00135* (2013.01); *B60H 2001/00142* (2013.01)

(58) Field of Classification Search
CPC ............ B60H 1/00007; B60H 1/00042; B60H 1/00057; B60H 1/00321; B60H 2001/00121
USPC .................................. 454/139, 141, 156, 159
See application file for complete search history.

(56) References Cited

U.S. PATENT DOCUMENTS

| | | | |
|---|---|---|---|
| 6,311,763 B1 * | 11/2001 | Uemura | B60H 1/00664 165/43 |
| 6,669,550 B1 * | 12/2003 | Urbank | B60H 1/247 454/121 |
| 2002/0117296 A1 | 8/2002 | Smith et al. | |
| 2003/0056531 A1 | 3/2003 | Nishida et al. | |
| 2005/0028968 A1 | 2/2005 | Kohle et al. | |
| 2005/0067158 A1 * | 3/2005 | Ito | B60H 1/00007 165/204 |

FOREIGN PATENT DOCUMENTS

| | | |
|---|---|---|
| FR | 2706816 A1 | 12/1994 |
| JP | 2010023589 A * | 2/2010 |

OTHER PUBLICATIONS

English language abstract for DE10336248 extracted from espacenet.com database dated Apr. 16, 2014, 8 pages.

English language abstract for FR2706816 extracted from espacenet.com database dated Apr. 16, 2014, 17 pages.

Machine-Assisted English translation for DE2941183 extracted from espacenet.com database dated Apr. 16, 2014, 17 pages.

\* cited by examiner

HEATING, VENTILATION AND/OR AIR-CONDITIONING APPARATUS INCLUDING AN AIR FLOW CHANNEL BYPASSING A HEAT EXCHANGER

RELATED APPLICATIONS

This application is the National Stage of International Patent Application No. PCT/EP2012/058303, filed on May 4, 2012 which claims priority to and all the advantages of French Patent Application No. FR 11/01550, filed on May 20, 2011, the content of which is incorporated herein by reference.

The technical sector of the present invention is that of heating, ventilation and/or air-conditioning installations for motor vehicles.

A motor vehicle is conventionally equipped with an air-conditioning loop, or coolant fluid circuit, in which a coolant fluid circulates. The air-conditioning loop notably includes a compressor, an external heat exchanger, an expansion unit and an evaporator through which the coolant fluid passes.

Moreover, in some particular arrangements, the air-conditioning loop also includes an interior gas cooler, notably an interior condenser, through which the coolant fluid passes. In such a configuration, the evaporator and the interior gas cooler are installed in a casing of heating, ventilation and/or air-conditioning apparatus, generally mounted in a passenger compartment of the vehicle. The casing enables channeling of an interior air flow, before being distributed into the passenger compartment of the vehicle. The interior air flow may be hot, cold or temperate as a function of what is required by a user of the vehicle. Moreover, the exterior heat exchanger is generally disposed on the front panel of the vehicle in order to have the flow of air exterior to the vehicle pass through it.

In this particular configuration, the air-conditioning loop may be used in various operating modes, notably in a so-called "cooling" mode and in a so-called "heating" mode.

In the so-called "cooling" mode, the coolant fluid is circulated by the compressor and is sent to the exterior heat exchanger. The exterior heat exchanger then behaves as a condenser, or gas cooler, in which the coolant fluid is cooled by the exterior air flow. Thereafter, the coolant fluid circulates toward the expansion unit, in which it is subjected to a reduction in pressure, before entering the evaporator. In the evaporator, the coolant fluid is heated by the interior air flow, intended to be diffused into the passenger compartment. In a correlated manner, the interior air flow is cooled, on passing through the evaporator, in order to lower the temperature of the passenger compartment of the vehicle. The air-conditioning loop being a closed circuit, the coolant fluid thereafter returns to the compressor.

In the so-called "heating" mode, the coolant fluid is circulated by the compressor and is sent to the interior gas cooler. In the interior gas cooler the coolant fluid is cooled by the interior air flow, circulating in the casing of the heating, ventilation and/or air-conditioning apparatus. In a correlated manner, the interior air flow is heated on passing through the interior gas cooler, in order to raise the temperature of the passenger compartment of the vehicle. Thereafter, the coolant fluid circulates toward the expansion unit, in which it is subjected to a reduction of pressure, before entering the exterior heat exchanger. The exterior heat exchanger then behaves as an evaporator, in which the coolant fluid is heated by the exterior air flow. The exterior air flow is consequently cooled on passing through the exterior heat exchanger. The air-conditioning loop being a closed circuit, the coolant fluid thereafter returns to the compressor.

The so-called "heating" mode is required in cold climatic conditions, i.e. when the temperature of the exterior air flow is low. In the so-called "heating" mode, it is known to take a portion of a flow of air coming from the passenger compartment, otherwise known as the recycled air flow, in order to constitute the interior air flow. As a matter of fact, the thermal load imposed to ensure heating of the recycled air flow is reduced compared to the thermal load imposed to ensure the heating of a flow of air coming from the passenger compartment coming from the exterior, or exterior air flow, since the temperature of the recycled air flow coming from the passenger compartment is higher than the temperature of the exterior air flow. Accordingly, the thermodynamic cycle operated by the air-conditioning loop requires less energy to heat the recycled air flow coming from the passenger compartment. This kind of configuration is obtained by closing an air inlet for the exterior air flow, or exterior air inlet, of the casing of the heating, ventilation and/or air-conditioning apparatus and opening an air inlet for the recycled air flow, or recycled air inlet, of the casing of the heating, ventilation and/or air-conditioning apparatus.

This kind of configuration of the casing of the heating, ventilation and/or air-conditioning apparatus has a drawback, however. As a matter of fact, it is not possible to use only the recycled air flow in the so-called "heating" mode because there exists a risk of misting of the windows of the passenger compartment. As a matter of fact, the presence of the passengers in the passenger compartment contributes to charging the recycled air flow with moisture which, after a certain time of use, condenses on the windows as soon as the temperature outside the vehicle makes it possible to reach the dew point.

Although it is desirable to lighten the thermal load of the air-conditioning loop by maximizing the quantity of recycled air flow used, it is clear that the residual relative humidity of the recycled air flow limits such use. In this situation, it is known to activate the air-conditioning loop in the so-called "cooling" mode in order to demist and cool the recycled air flow by passage through the evaporator.

However, the so-called "cooling" mode leads to lowering of the temperature of the interior air flow, produced by admission of the recycled air flow into the casing of the heating, ventilation and/or air-conditioning apparatus. This therefore imposes the supply of additional energy necessary to heat the interior air flow to a level acceptable for the comfort of the passengers of the vehicle, before distributing the interior air flow into the passenger compartment. Overall, there therefore exists a consumption of energy for cooling and drying the interior air flow beforehand and an additional consumption of energy for heating the interior air flow.

Moreover, in the so-called "heating" mode, the air-conditioning loop may be arranged so that the casing of the heating, ventilation and/or air-conditioning apparatus accommodates two heat exchangers functioning as members for heating the interior air flow. Now, for some coolant fluids, in particular for over-critical coolant fluids, such as the coolant fluid known as R744A or CO2, the thermal load can be reduced.

However, the benefit obtained by reducing the thermal load is lost by the degraded performance of the air-conditioning loop.

The object of the present invention is therefore to overcome the drawbacks described above by organizing a heating, ventilation and/or air-conditioning apparatus so as, on the one hand, to dry the interior air flow coming from the passenger compartment and, on the other hand, to allow entry of the exterior air flow, without causing it to pass through the evaporator.

This avoids the appearance of misting on the windows of the passenger compartment of the vehicle. Moreover, such an arrangement makes it possible to limit the consumption of energy necessary for heating the air flow.

There therefore follows a limitation of the thermal load of the air-conditioning loop. Such a limitation is particularly beneficial for limiting the quantity of heat extracted in the air flow without degrading the coefficient of performance of the air-conditioning loop.

The subject matter of the invention is therefore heating, ventilation and/or air-conditioning apparatus for a passenger compartment of a motor vehicle including a casing including a first air inlet and a second air inlet. The casing channels an interior air flow coming from the first air inlet and/or the second air inlet and accommodates at least a first heat exchanger.

The casing more particularly includes an air circulation channel channeling the interior air flow in the casing so that it bypasses the first heat exchanger and an air inlet duct channeling the interior air flow in the casing through the first heat exchanger.

In a first variant of the present invention, the air circulation channel includes a first intake connected to the first air inlet. The intake and the first air inlet advantageously lie in the same plane.

Likewise, in the first variant of the present invention, the first air inlet is adapted to receive an exterior air flow coming from the exterior of the passenger compartment and the second air inlet is adapted to receive a recycled air flow coming from the interior of the passenger compartment.

It is therefore clear that, in the first variant of the present invention, the air circulation channel conveys an exterior air flow introduced into the casing via the first air inlet and coming from the exterior of the passenger compartment.

In a second variant of the present invention, the air circulation channel includes an intake connected to the second air inlet. The intake and the second air inlet advantageously lie in the same plane.

Likewise, in the second variant of the present invention, the first air inlet is adapted to receive an exterior air flow coming from the exterior of the passenger compartment and the second air inlet is adapted to receive a recycled air flow coming from the interior of the passenger compartment.

It is therefore clear that, in the second variant of the present invention, the air circulation channel conveys a recycled air flow introduced into the casing via the second air inlet and coming from the interior of the passenger compartment.

In accordance with an additional feature of the invention, the circulation of the interior air flow in the air circulation channel is controlled by a first air inlet flap.

In accordance with another feature of the invention, the circulation of the interior air flow in the air circulation duct coming from the first air inlet and/or the second air inlet is controlled by a second interior flap.

The casing advantageously includes an interior wall installed between the air circulation channel and the air inlet duct in order to separate the interior air flow into a first air flow channeled toward the air inlet duct through the first heat exchanger and a second air flow channeled by the air circulation channel and bypasses the first heat exchanger.

More particularly, the interior wall extends from the first air inlet and/or the second air inlet as far as a space within the casing that, relative to the direction of flow of the interior air flow in the casing, is on the downstream side of the first heat exchanger.

Thus the interior wall extends as far as the first air inlet when the air circulation channel conveys an exterior air flow coming from the exterior of the passenger compartment and the interior wall extends as far as the second inlet when the air circulation channel conveys a recycled air flow coming from the interior of the passenger compartment.

The heating, ventilation and/or air-conditioning apparatus in accordance with the present invention further advantageously includes an additional heating device installed, relative to the direction of flow of the interior air flow inside the casing, on the upstream side of the first heat exchanger. This kind of arrangement of the additional heating device on the upstream side of the first heat exchanger makes it possible to prevent all risk of the first heat exchanger icing up, notably when the temperature of the interior air flow passing through it is low, in particular below 0° C., and has a high moisture content.

In accordance with a further feature of the invention, the first heat exchanger is installed on the upstream side, in the flow direction of the interior air flow in the casing, of an electric fan adapted to move the interior air flow in the casing.

To be more precise, the air circulation channel terminates on the upstream side of the electric fan. In other words, the bypass effected by the air circulation channel is limited to the first heat exchanger.

In a complementary way, the casing accommodates at least one second heat exchanger installed, relative to the direction of flow of the interior air flow in the casing, on the downstream side of the electric fan.

The invention also covers a heating, ventilation and/or air-conditioning installation of a motor vehicle passenger compartment, including, on the one hand, an air-conditioning loop through which passes a coolant fluid and which includes at least a compressor, a first expansion unit, an exterior heat exchanger and the first heat exchanger, and, on the other hand, the heating, ventilation and/or air-conditioning apparatus as defined above.

In a complementary manner, the air-conditioning loop includes the second heat exchanger installed in the casing of the heating, ventilation and/or air-conditioning apparatus.

Moreover, in accordance with another feature of the present invention, the air-conditioning loop includes a second expansion unit. The air-conditioning loop may optionally include an internal heat exchanger adapted to provide an exchange of heat between the coolant fluid at high temperature and the coolant fluid at low temperature.

The advantages of the present invention reside in:
- the possibility of channeling an air flow so that it enters the heating, ventilation and/or air-conditioning apparatus to be heated therein without passing through the first heat exchanger;
- the possibility of lightening the thermal load of the air-conditioning loop used in a so-called "heating" mode whilst avoiding a risk of misting of the windows of the vehicle;
- the possibility of fine control of the quantity of air flow circulating and bypassing the first heat exchanger, in order to achieve an ideal compromise between the consumption of the air-conditioning loop and the risk of misting in the passenger compartment;

improved passenger comfort, through enabling the rise in temperature of the passenger compartment in wintery conditions to be speeded up; and the possibility of reducing the weight, size and cost of the components of the air-conditioning loop used to provide a heating function.

The present invention will be better understood and other features and advantages will become more apparent on reading the following detailed description, covering embodiments provided by way of illustration and given by way of non-limiting example and with reference to the appended figures, which may serve to add to the understanding of the present invention and the explanation of how it is reduced to practice and, where appropriate, to contribute to its definition; in the drawings:

By convention, the terms "upstream" and "downstream" are to be interpreted relative to the direction of circulation of a fluid to which they relate.

Figure 1:
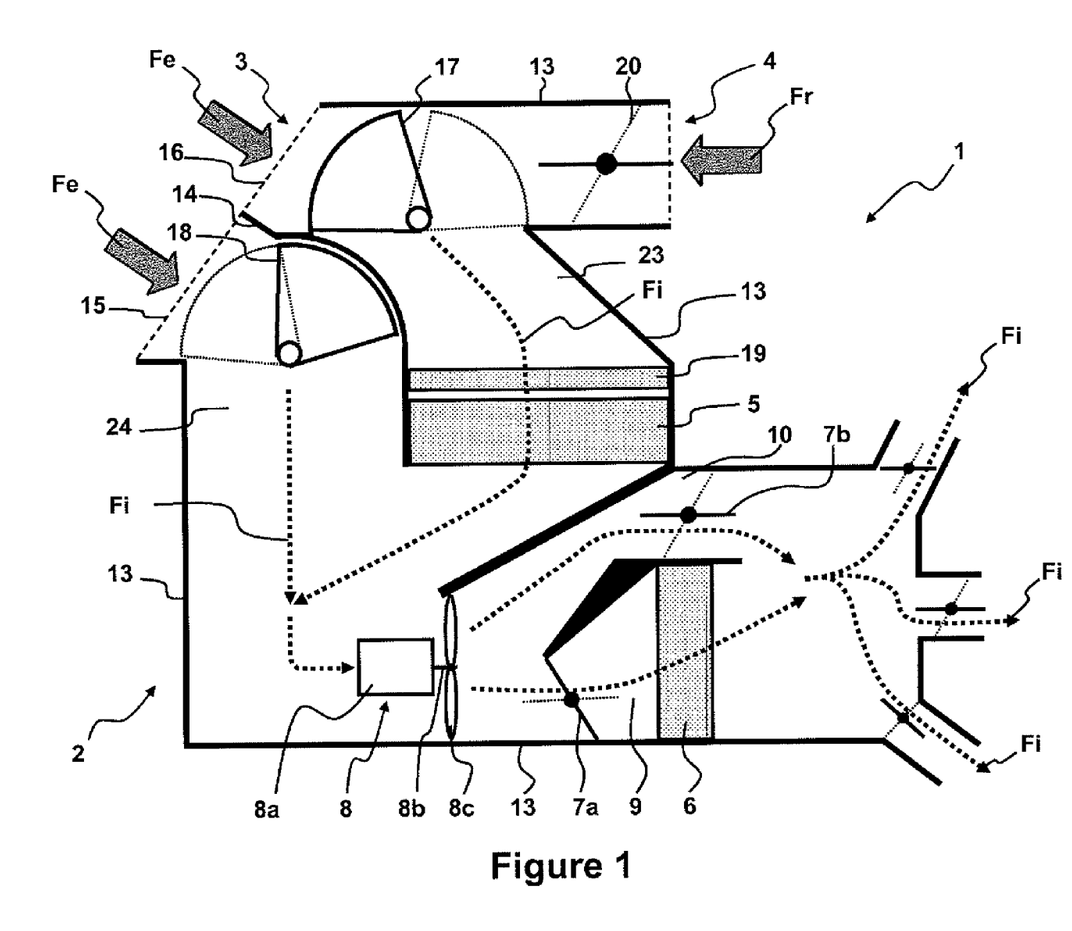
FIG. 1 shows heating, ventilation and/or air-conditioning apparatus conforming to a first variant of the present invention.
Figure 2:
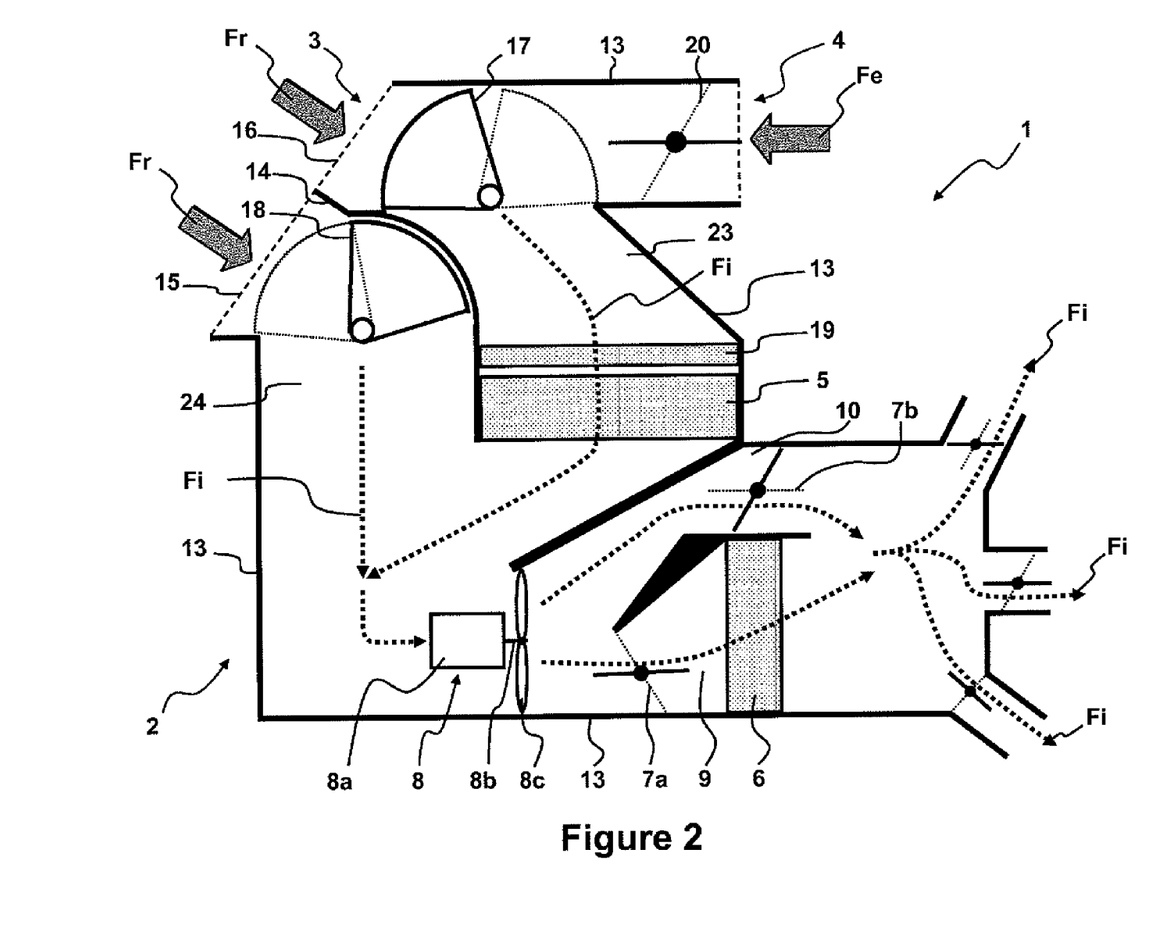
FIG. 2 shows heating, ventilation and/or air-conditioning apparatus conforming to a second variant of the present invention.

FIGS. 1 and 2 show heating, ventilation and/or air-conditioning apparatus 1 adapted to be mounted in a motor vehicle to distribute an interior air flow Fi at an appropriate temperature. The interior air flow Fi can be cold, hot or temperate, as a function of the requirements of the occupants of the vehicle.

The heating, ventilation and/or air-conditioning apparatus 1 includes a casing 2 delimiting an enclosure of the heating, ventilation and/or air-conditioning apparatus 1. The casing 2 thus forms an enclosure, preferably made of plastic, notably produced by assembling a plurality of separate parts.

The casing 2 channels the interior air flow Fi between at least one air inlet and an air outlet. To be more precise, the interior air flow Fi is made up of a mixture of an exterior air flow Fe and/or a recycled air flow Fr, in varying proportions.

By definition, the exterior air flow Fe is an air flow taken from the exterior of the passenger compartment of the vehicle and the recycled air flow Fr is an air flow taken from the interior of the passenger compartment of the vehicle.

To this end, the casing 2 includes at least a first air inlet 3 and a second air inlet 4 adapted to admit the exterior air flow Fe and/or the recycled air flow Fr.

The first air inlet 3 and the second air inlet 4 can be opened or closed, wholly or in part, by control means, in order to allow the admission of the exterior air flow Fe and/or the recycled air flow Fr, in varying proportions.

In accordance with a first option, the first air inlet 3 and the second air inlet 4 are such that the casing 2 receives only the exterior air flow Fe. In accordance with a second option, the first air inlet 3 and the second air inlet 4 are such that the casing 2 receives only the recycled air flow Fr. In accordance with other examples, the first air inlet 3 and the second air inlet 4 are such that the casing 2 receives the exterior air flow Fe and the recycled air flow Fr in varying proportions.

It is therefore clear that the first air inlet 3 and the second air inlet 4 each receive an air flow from a separate source.

The casing 2 also serves as a mechanical support for various components of an air-conditioning loop for applying heat treatment to the interior air flow Fi. For example, the casing 2 accommodates a first heat exchanger 5 and a second heat exchanger 6 installed in the casing 2 of the heating, ventilation and/or air-conditioning apparatus 1 so as to have the interior air flow Fi pass through them.

The various components of the air-conditioning loop installed in the casing 2 of the heating, ventilation and/or air-conditioning apparatus 1, notably the first heat exchanger 5 and the second heat exchanger 6, allow modification of the aerothermic parameters of the interior air flow Fi in order for it to be conditioned as appropriate to the comfort parameters required by the occupants of the vehicle.

The first heat exchanger 5 is preferably separate from the second heat exchanger 6, at least where their parts inside the casing 2 are concerned.

In accordance with a first variant, the function of the first heat exchanger 5 is to cool the interior air flow Fi passing through it. In other words, the first heat exchanger 5 functions as an evaporator.

The first heat exchanger 5 is used in a so-called "cooling" mode of operation in which the interior air flow Fi is cooled before it is distributed into the passenger compartment in order to lower the temperature of the passenger compartment of the vehicle, in particular during periods in which the exterior temperature is high, i.e. in hot seasons.

The first heat exchanger 5 is also used in a so-called "demisting" mode of operation in which the interior air flow Fi is dried before it is distributed into the passenger compartment, in particular to avoid misting of the windows of the passenger compartment. In the so-called "demisting" mode of operation, the interior air flow Fi is preferably dried by the first heat exchanger 5 as it cools it.

In accordance with the first variant, the function of the second heat exchanger 6 is to heat the interior air flow Fi passing through it. In other words, the second heat exchanger 6 functions as a radiator.

The second heat exchanger 6 is used in a so-called "heating" mode of operation in which the interior air flow Fi is heated before it is distributed into the passenger compartment, in order to raise the temperature of the passenger compartment of the vehicle, in particular during periods during which the exterior temperature is low, i.e. in cold seasons.

The second heat exchanger 6 is also used in the so-called "demisting" mode of operation in which the interior air flow Fi is dried by the first heat exchanger 5 and then heated by the second heat exchanger 6 before its distribution into the passenger compartment. An arrangement of this kind allows a heated passenger compartment without the windows of the passenger compartment misting up.

The first heat exchanger 5, respectively the second heat exchanger 6, may be a heat exchanger of the coolant fluid/air type, for example, allowing exchange of heat between a coolant fluid circulating in the air-conditioning loop and the interior air flow Fi channeled in the casing 2.

Alternatively, the first heat exchanger 5, respectively the second heat exchanger 6, may be a heat exchanger of the heat-exchange fluid/air type, for example, allowing exchange of heat between a heat-exchange fluid and the interior air flow Fi channeled in the casing 2.

A further alternative is for the first heat exchanger 5, respectively the second heat exchanger 6, to be a heat exchanger of the coolant fluid/heat-exchange fluid type, for example, allowing exchange of heat between the coolant fluid circulating in the air-conditioning loop and the interior air flow Fi channeled in the casing 2 by means of the heat-exchange fluid.

Specifically, the first heat exchanger 5, respectively the second heat exchanger 6, of the heat-exchange fluid/air type, may be part of a secondary loop in which the heat-exchange fluid circulates in order to provide the function of transfer of heat between the air-conditioning loop and the interior air flow Fi circulating in the casing 2 of the heating, ventilation and/or air-conditioning apparatus 1.

Alternatively, the first heat exchanger 5, respectively the second heat exchanger 6, of the heat-exchange fluid-air type, may be part of a heat-exchange circuit, including a heat source (for example a heating device, notably an electrical heating device, a engine, notably an internal combustion engine, a battery, etc.) or a cold source. The heat-exchange fluid circulates in the heat exchange circuit in order to provide the function of transfer of heat between the heat source or the cold source and the interior air flow Fi circulating in the casing 2 of the heating, ventilation and/or air-conditioning apparatus 1.

The first heat exchanger 5 and the second heat exchanger 5 preferably exchange heat with the air-conditioning loop allowing circulation of the coolant fluid in accordance with a particular thermodynamic cycle. The first heat exchanger 5 and the second heat exchanger 6 are therefore adapted to dissipate in the interior air flow Fi a positive or negative heat flow generated during the thermodynamic cycle in the air-conditioning loop.

The first heat exchanger 5 is installed in an air inlet duct 23 in the casing 2. More specifically, the air inlet duct 23 is disposed, relative to the direction of flow of the interior air flow Fi in the casing 2, on the downstream side of the first air inlet 3 and the second air inlet 4. Accordingly, the air inlet duct 23 is adapted to channel the interior air flow Fi consisting of the exterior air flow Fe and/or the recycled air flow Fr. Consequently, depending on the configuration of the control means of the first air inlet 3 and the second air inlet 4, the first heat exchanger 5 therefore has passed through it the exterior air flow Fe or the recycled air flow Fr or a mixture of the exterior air flow Fe and the recycled air flow Fr.

In accordance with the present invention, the air inlet duct 23 is delimited by an exterior wall 13 of the casing 2 and an interior wall 14 arranged in the casing 2. The interior wall 14 is arranged in the casing 2 so as to share part of the interior volume of the casing 2. The interior wall 14 therefore also defines, with the exterior wall 13 of the casing 2, an air circulation channel 24.

The casing 2 is thus configured so that the interior wall 14 is between the air circulation channel 24 and the air inlet duct 23. The interior wall 14 is advantageously between the first heat exchanger 5 in the air inlet duct 23 and the air circulation channel 24.

The interior wall 14 preferably extends from the first air inlet 3 in order to separate the air flow entering via the first air inlet 3 into a first air flow channeled toward the air inlet duct 23 through the first heat exchanger 5 and a second air flow channeled by the air circulation channel 24 and bypassing the first heat exchanger 5.

The casing 2 also includes a first air transmission channel 9 and a second air transmission channel 10. The first air transmission channel 9 and the second air transmission channel 10 are preferably, relative to the direction of flow of the interior air flow in the casing 2, on the downstream side of the air inlet duct 23 and the air circulation channel 24.

In accordance with the present invention, the first air transmission channel 9 accommodates the second heat exchanger 6 and the second air transmission channel 10 is in parallel with the first air transmission channel 9.

Accordingly, the interior air flow Fi is channeled by the first air transmission channel 9 in order to pass through the second heat exchanger 6 and is channeled by the second air transmission channel 10 in order to bypass the second heat exchanger 6.

The casing 2 also includes mixing means 7 formed by at least one mixing flap, for example. More specifically, in the embodiment shown in FIG. 1, the mixing means 7 consist of a first mixing flap 7a in the first air transmission channel 9 and a second mixing flap 7b in the second air transmission channel 10.

The mixing means 7 allow calibration of the interior air flow Fi channeled in the first air transmission channel 9 and in the second air transmission channel 10.

In accordance with a first alternative embodiment, the first heat exchanger 5 is the evaporator of the air-conditioning loop and the second heat exchanger 6 is a radiator or a gas cooler, or condenser, of the air-conditioning loop. In accordance with this arrangement, the first air transmission channel 9 is a "hot" air channel and the second air transmission channel 10 is a "cold" air channel.

The mixing means 7 assume various positions in order to calibrate the interior air flow Fi in the first air transmission channel 9 and in the second air transmission channel 10. Accordingly, on the downstream side of the first air transmission channel 9 and in the second air transmission channel 10 the interior air flow Fi is the result of mixing air flows coming from the "hot" air channel and the "cold" air channel.

In the embodiment shown in FIG. 1, the configuration of the first mixing flap 7a and the second mixing flap 7b shown in FIG. 1 is such that the interior air flow Fi bypasses completely the second heat exchanger 6.

The interior air flow Fi in the casing 2 is moved by an electric fan 8 mounted in the casing 2. More specifically, the electric fan 8 is responsible for moving the interior air flow Fi circulating in the casing 2. In other words, the electric fan 8 is arranged in the casing 2 so as to circulate the interior air flow Fi coming from the exterior of the passenger compartment, or exterior air flow Fe, and/or coming from the interior of the passenger compartment, or recycled air flow Fr.

The electric fan 8 comprises an electric motor 8a driving rotation of a fan 8b via a shaft 8c.

In the FIG. 1 nonlimiting embodiment, the first heat exchanger 5 is arranged inside the casing 2 on the upstream side of the air inlet duct 23 and the air circulation channel 24 relative to the direction of flow of the interior air flow Fi in the casing 2. Consequently, the electric fan 8 aspirates the interior air flow Fi coming from the air circulation channel 24 and/or the air inlet duct 23 that has passed through the first heat exchanger 5.

Moreover, in the FIG. 1 nonlimiting embodiment, the second heat exchanger 6 is installed on the downstream side of the electric fan 8, relative to the direction of flow of the interior air flow Fi in the casing 2. The electric fan 8 therefore propels the interior air flow Fi toward the second heat exchanger 6. The electric fan 8 is thus placed in the casing 2 between the first heat exchanger 5 and the second heat exchanger 6, from the point of view of the flow of the interior air flow Fi.

In accordance with the present invention, the interior wall 14 arranged inside the casing 2 defines a separation within the casing 2 in order for it to be possible to channel the interior air flow Fi in the air inlet duct 23 in order to pass through the first heat exchanger 5 or the air circulation channel 24 in order to bypass the first heat exchanger 5.

As described above, the interior wall 14 extends from the first heat exchanger 5 as far as the first air inlet 3. Accordingly, the first air inlet 3 is divided into a first air intake 15 connected to the air circulation channel 24 and a second air intake 16 connected to the air inlet duct 23.

The air circulation channel 24 has at one of its ends the first air intake 15 delimited by an open portion of the casing 2 extending between the exterior wall 13 and the interior wall 14.

In one embodiment, the first air intake 15 and the first air inlet 3 are coplanar. Likewise, the second air intake 16 and the first air inlet 3 are coplanar.

Alternatively, the present invention also covers the situation in which the first intake 15 and the first air inlet 3 are arranged in two separate planes joined by a portion of the exterior wall 13. Likewise, the second air intake 16 and the first air inlet 3 are arranged in two separate planes joined by a portion of the exterior wall 13.

The casing 2 of the heating, ventilation and/or air-conditioning apparatus 1 also includes control means for allowing or preventing circulation of the air flow through the first air inlet 3 and the second air inlet 4.

In the embodiment shown in FIG. 1, the first air inlet 3 and/or the second air inlet 4 communicate with the first heat exchanger 5 via the air inlet duct 23. In other words, the first heat exchanger 5 can have passed through it the recycled air flow, the exterior air flow or a mixture of the recycled air flow Fr and the exterior air flow Fe.

The recycled air flow Fr and the exterior air flow Fe are mixed by a first air inlet flap 17 placed in the casing 2. The first air inlet flap 17 controls the proportion of the recycled air flow Fr and the exterior air flow Fe sent toward the first heat exchanger 5. In the FIG. 1 embodiment, the first air inlet flap 17 is a so-called "drum" flap. However, the present invention covers other types of flaps, notably a so-called "flag" flap, a so-called "butterfly" flap, etc.

The first air inlet flap 17 is represented in continuous line in a first extreme position in which it closes the second air intake 16 of the first air inlet 3 and opens the second air inlet 4. The second extreme position of the first air inlet flap 17 is represented in dotted line. In the second extreme position, the first air inlet flap 17 opens the second air intake 16 of the first air inlet 3 and closes the second air inlet 4. However, the first air inlet flap 17 can also assume intermediate positions between the first extreme position and the second extreme position in order to allow entry of the exterior air flow Fe and the recycled air flow Fr into the air inlet duct 23.

Moreover, the casing 2 also includes a second air inlet flap 18 for controlling the entry of the air flow into the air circulation channel 24. In accordance with the FIG. 1 embodiment, the second air inlet flap 18 is a so-called "drum" flap. However, the present invention covers other types of flaps, notably a so-called "flag" flap, a so-called "butterfly" flap, etc.

The second air inlet flap 18 is advantageously disposed in line with the first air intake 15, i.e. immediately at the entry of the air circulation channel 24.

In the FIG. 1 embodiment, the second air inlet flap 18 being a so-called "drum" flap, the interior wall 14 favorably has a rounded shape complementary to the shape of the second air inlet flap 18. The rounded shape of the interior wall 14 delimits an area of disengagement of the second air inlet flap 18 when the latter allows entry of the air flow into the air circulation channel 24.

The second air inlet flap 18 is represented in continuous line in a first extreme position in which it opens the first air intake 15 of the first air inlet 3. The second extreme position of the second air inlet flap 18 is represented in dotted line. In the second extreme position, the second air inlet flap 18 closes the first air intake 15 of the first air inlet 3. However, the second air inlet flap 18 can also assume intermediate positions between the first extreme position and the second extreme position in order to calibrate the entry of the air flow into the air circulation channel 24.

Moreover, in accordance with one particular alternative, a third air inlet flap 20 may be arranged inside the casing 2 of the heating, ventilation and/or air-conditioning apparatus 1 in order to enable adjustment of the exterior air flow Fe and/or the recycled air flow Fr.

Finally, in accordance with the present invention, the casing 2 of the heating, ventilation and/or air-conditioning apparatus 1 optionally includes an additional heating device 19. The additional heating device 19 is preferably installed on the upstream side of the first heat exchanger 5 relative to the direction of flow of the interior air flow Fi in the casing 2. For example, the additional heating device 19 lies in a plane parallel to a plane in which the first heat exchanger 5 lies.

In particular, the additional heating device 19 is an electric radiator, such as a PTC (positive temperature coefficient) electric radiator, for example, supplied with power by the electrical power network of the vehicle, for example. The voltage of the electrical power network of the vehicle may be 12 volts but it is advantageous to power the electric radiator at a voltage between 80 volts and 600 volts.

The additional heating device 19 adds to the interior air flow Fi the heat necessary to prevent the first heat exchanger 5 from icing up.

In accordance with a first variant of the present invention, the first air inlet 3 allows entry of the exterior air flow Fe and the second air inlet 4 allows entry of the recycled air flow Fr. A configuration of this kind is shown in FIG. 1.

In accordance with the FIG. 1 arrangement, the first air inlet flap 17 prevents entry of the exterior air flow Fe into the casing 2 to pass through the first heat exchanger 5 whilst allowing total access of the recycled air flow Fr in the air inlet duct 23 to the first heat exchanger 5. In this configuration, the second air inlet flap 18 allows entry of the exterior air flow Fe into the casing 2. The exterior air flow Fe is channeled in the air circulation channel 24.

Thereafter, the interior air flow Fi is aspirated by the electric fan 8. The interior air flow Fi is then propelled toward a portion of the casing 2 accommodating the second heat exchanger 6.

In accordance with a second variant of the present invention, the first air inlet 3 allows entry of the recycled air flow Fr and the second air inlet 4 allows entry of the exterior air flow Fe. A configuration of this kind is shown in FIG. 2.

The description that will be given of FIG. 2 describes the differences relative to the first variant from FIG. 1. The description given hereinafter should therefore be referred to for identical elements or components. In FIG. 2, elements identical to those in FIG. 1 bear the same reference numbers. Unless otherwise mentioned, identical elements in FIG. 1 and FIG. 2 therefore have the same technical characteristics and operate in accordance with the same modes of operation.

As in the FIG. 1 variant of the present invention, the sources of the recycled air flow Fr and the exterior air flow Fe are separate.

In the FIG. 2 embodiment, the first air inlet 3 is adapted to receive the recycled air flow Fr coming from the interior of the passenger compartment of the vehicle and the second air inlet 4 is adapted to receive the exterior air flow Fe coming from the exterior of the passenger compartment of the vehicle.

In accordance with the second variant of the present invention, the air circulation channel 24 bypassing the first heat exchanger 5 has passed through it a recycled air flow Fr coming exclusively from the interior of the passenger compartment.

On the other hand, in the air inlet duct 23, the first heat exchanger 5 is adapted to receive the recycled air flow Fr or the exterior air flow Fe or a mixture of the recycled air flow Fr and the exterior air flow Fe.

Additionally or alternatively, in accordance with the second variant of the present invention, in the so-called "heating" mode, the function of the first heat exchanger 5 is to heat the interior air flow Fi. To this end, the first heat exchanger 5 acts as a radiator for preheating the interior air flow Fi. The second heat exchanger 6 then provides additional heating.

The second variant of the present invention has the advantage of mixing the source of the interior air flow Fi. There is then, on the one hand, an exchange of heat between the recycled air flow Fr and the second heat exchanger 6 and, on the other hand, an exchange of heat between the recycled air flow and/or the exterior air flow Fe and the first heat exchanger 5.

An arrangement of this kind enables a high coefficient of performance of the air-conditioning loop to be maintained in the so-called "heating" mode.

The invention also encompasses the fact that the heating, ventilation and/or air-conditioning apparatus 1 is combined with an air-conditioning loop (not shown) through which a coolant fluid passes and that is mounted on the motor vehicle to form a system for thermal conditioning of the passenger compartment.

The first heat exchanger 5 and the second heat exchanger 6 are thus components of the air-conditioning loop:
  referred to as "direct" when the first heat exchanger 5 and the second heat exchanger 6 are heat exchangers of the coolant fluid/air type allowing an exchange of heat between the coolant fluid circulating in the air conditioning loop and the interior air flow Fi channeled in the casing 2, or
  referred to as "indirect" when the first heat exchanger 5 and/or the second heat exchanger 6 are heat exchangers of the coolant fluid/heat-exchange fluid type allowing an exchange of heat between the coolant fluid circulating in the air-conditioning loop and the interior air flow Fi channeled in the casing 2 via the heat-exchange fluid.

To this end, the air-conditioning loop notably includes, in the direction of flow of the coolant fluid, a compressor, the second heat exchanger 6, a first expansion unit, the first heat exchanger 5, an optional second expansion unit, and an exterior heat exchanger adapted to provide an exchange of heat between the coolant fluid and the exterior air flow Fe.

Additionally, the air-conditioning loop also includes an internal heat exchanger adapted to provide an exchange of heat between the coolant fluid at high temperature and the coolant fluid at low temperature, which interior heat exchanger may form a module when it is combined with an accumulator.

An air-conditioning loop of this kind is adapted to operate at least in the so-called "heating" mode, the so-called "cooling" mode and/or the so-called "demisting" mode.

For example, in the so-called "heating" mode, the first heat exchanger 5 and the second heat exchanger 6 are at the same coolant fluid pressure level because the first expansion unit does not produce any reduction of pressure. This kind of configuration of the air-conditioning loop is particularly suitable for the second variant of the present invention as shown in FIG. 2.

In the so-called "cooling" mode and in the so-called "demisting" mode, the first expansion unit reduces the pressure of the coolant fluid on the downstream side of the second heat exchanger 6 and on the upstream side of the first heat exchanger 5. The first heat exchanger 5 then behaves as an evaporator. This kind of configuration of the air-conditioning loop is particularly suitable for the first variant of the present invention as shown in FIG. 1.

The present invention also concerns a heating, ventilation and/or air-conditioning installation comprising an air-conditioning loop and heating, ventilation and/or air-conditioning apparatus as described above.

Obviously, the invention is not limited to the embodiments described above by way of example only. It encompasses diverse modifications, alternative forms and other variants that the person skilled in the art might envisage within the scope of the present invention and notably all combinations of the various embodiments described above, separately or in combination.

In particular, the present invention notably covers heating, ventilation and/or air-conditioning apparatus 1 for a passenger compartment of a motor vehicle including a casing 2 channeling the interior air flow Fi and accommodating at least the first heat exchanger 5 and the second heat exchanger 6. The casing 2 includes a first air inlet 3 and a second air inlet 4. Moreover, in accordance with this embodiment, the casing 2 incorporates a first air circulation channel adapted to channel the exterior air flow Fe so that it bypasses the first heat exchanger 5 and a second air circulation channel adapted to channel the recycled air flow Fr so that it bypasses the first heat exchanger 5.

The invention claimed is:

1. A heating, ventilation and/or air-conditioning apparatus (1) for a passenger compartment of a motor vehicle, the heating, ventilation and/or air-conditioning apparatus (1) comprising a casing (2) including a first air inlet (3) and a second air inlet (4) and channeling an interior air flow (Fi) coming from the first air inlet (3) or the second air inlet (4), the casing (2) accommodating at least a first heat exchanger (5),
  wherein the casing (2) includes:
    an air circulation channel (24) channeling the interior air flow (Fi) in the casing (2) so that the interior air flow (Fi) bypasses the first heat exchanger (5), and an air inlet duct (23) channeling the interior air flow (Fi) in the casing (2) through the first heat exchanger (5), the air inlet duct (23) is delimited by an exterior wall (13) of the casing (2) and an interior wall (14) arranged in the casing (2), the interior wall (14) also defining, with the exterior wall (13) of the casing (2), the air circulation channel (24), wherein the interior wall (14) is between the first heat exchanger (5) in the air inlet duct (23) and the air circulation channel (24), the interior wall (14) extending from the first air inlet (3) toward the air inlet duct (23) and wherein interior wall (14) begins with a first straight portion at the first air inlet (3), followed by a concave-curved portion that accommodates a second air inlet flap (18), and ends with a second straight portion adjacent an end of the first heat exchanger (5).

2. The heating, ventilation and/or air-conditioning apparatus (1) as claimed in claim 1, wherein the air circulation channel (24) includes an intake (15) connected to the second air inlet (4).

3. The heating, ventilation and/or air-conditioning apparatus (1) as claimed in claim 1, wherein the air circulation channel (24) includes an intake (15) connected to the first air inlet (3).

4. The heating, ventilation and/or air-conditioning apparatus (1) as claimed in claim 2, wherein the air circulation channel (24) includes the intake (15) connected to the first air inlet (3).

5. The heating, ventilation and/or air-conditioning apparatus (1) as claimed in claim 4, wherein the first air inlet (3) is adapted to receive a recycled air flow (Fr) coming from the interior of the passenger compartment, and the second air inlet (4) is adapted to receive an exterior air flow (Fe) coming from the exterior of the passenger compartment.

6. The heating, ventilation and/or air-conditioning apparatus (1) as claimed in claim 4, wherein the first air inlet (3) is adapted to receive an exterior air flow (Fe) coming from the exterior of the passenger compartment, and the second air inlet (4) is adapted to receive a recycled air flow (Fr) coming from the interior of the passenger compartment.

7. The heating, ventilation and/or air-conditioning apparatus (1) as claimed in claim 1, wherein the first air inlet (3) is adapted to receive a recycled air flow (Fr) coming from the interior of the passenger compartment, and the second air inlet (4) is adapted to receive an exterior air flow (Fe) coming from the exterior of the passenger compartment.

8. The heating, ventilation and/or air-conditioning apparatus (1) as claimed in claim 1, wherein the first air inlet (3) is adapted to receive an exterior air flow (Fe) coming from the exterior of the passenger compartment, and the second air inlet (4) is adapted to receive a recycled air flow (Fr) coming from the interior of the passenger compartment.

9. The heating, ventilation and/or air-conditioning apparatus (1) as claimed in claim 1, wherein the circulation of the interior air flow (Fi) in the air circulation channel (24) is controlled by a first air inlet flap (17).

10. The heating, ventilation and/or air-conditioning apparatus (1) as claimed in claim 1, wherein the circulation of the interior air flow (Fi) in the air inlet duct (23) coming from the first air inlet (3) or the second air inlet (4) is controlled by the second air inlet flap (18).

11. The heating, ventilation and/or air-conditioning apparatus (1) as claimed in claim 1, wherein the casing (2) includes the interior wall (14) installed between the air circulation channel (24) and the air inlet duct (23) in order to separate the interior air flow (Fi) into a first air flow channeled toward the air inlet duct (23) through the first heat exchanger (5) and a second air flow channeled by the air circulation channel (24) so that the interior air flow (Fi) bypasses the first heat exchanger (5).

12. The heating, ventilation and/or air-conditioning apparatus (1) as claimed claim 1, wherein an additional heating device (19) is installed on the upstream side of the first heat exchanger (5) relative to the direction of flow of the interior air flow (Fi) in the casing (2).

13. The heating, ventilation and/or air-conditioning apparatus (1) as claimed in claim 1, wherein the first heat exchanger (5) is installed on the upstream side, relative to the direction of flow of the interior air flow (Fi) in the casing (2), of an electric fan (8) adapted to move the interior air flow (Fi) in the casing (2).

14. The heating, ventilation and/or air-conditioning apparatus (1) as claimed in claim 13, wherein the casing (2) accommodates at least a second heat exchanger (6) installed on the downstream side, relative to the direction of flow of the interior air flow (Fi) in the casing (2), of the electric fan (8).

15. A heating, ventilation and/or air-conditioning installation of a motor vehicle passenger compartment, the installation including:
an air-conditioning loop through which passes a coolant fluid and which includes at least a compressor, a first expansion unit, an exterior heat exchanger and the first heat exchanger (5), and
on the other hand, the heating, ventilation and/or air-conditioning apparatus (1) as claimed in claim 1.

16. The heating, ventilation and/or air-conditioning installation as claimed in claim 13 of a motor vehicle passenger compartment, wherein the air-conditioning loop includes a second heat exchanger (6) installed in the casing (2) of the heating, ventilation and/or air-conditioning apparatus (1).

17. The heating, ventilation and/or air-conditioning installation as claimed in claim 12 of a motor vehicle passenger compartment, wherein the air-conditioning loop includes a second expansion unit or an internal heat exchanger adapted to provide an exchange of heat between the coolant fluid at high temperature and the coolant fluid at low temperature.

* * * * *

UNITED STATES PATENT AND TRADEMARK OFFICE
CERTIFICATE OF CORRECTION

PATENT NO. : 9,821,626 B2
APPLICATION NO. : 14/118445
DATED : November 21, 2017
INVENTOR(S) : Klaus Wittmann et al.

It is certified that error appears in the above-identified patent and that said Letters Patent is hereby corrected as shown below:

In the Claims

Claim 16, Column 14, Line 34, please delete "as claimed in claim 13" and replace with -- as claimed in claim 15 --

Claim 17, Column 14, Line 39, please delete "as claimed in claim 12" and replace with -- as claimed in claim 15 --

Signed and Sealed this
Sixth Day of March, 2018

Andrei Iancu
*Director of the United States Patent and Trademark Office*